(12) United States Patent
Alexander et al.

(10) Patent No.: US 8,864,392 B2
(45) Date of Patent: Oct. 21, 2014

(54) CAMERA SYSTEM

(71) Applicants: GM Global Technology Operations LLC, Detroit, MI (US); Dynalloy, Inc., Tustin, CA (US)

(72) Inventors: Paul W. Alexander, Ypsilanti, MI (US); Alan L. Browne, Grosse Pointe, MI (US); Nancy L. Johnson, Northville, MI (US); James Holbrook Brown, Costa Mesa, CA (US); James Ryan Yates, Mission Viejo, CA (US); Brian W. Bowling, San Dimas, CA (US); James Q. La, Long Beach, CA (US); Aragorn Zolno, Whittier, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/761,854

(22) Filed: Feb. 7, 2013

(65) Prior Publication Data

US 2013/0209079 A1    Aug. 15, 2013

Related U.S. Application Data

(60) Provisional application No. 61/599,213, filed on Feb. 15, 2012.

(51) Int. Cl.
| | | |
|---|---|---|
| G03B 17/00 | (2006.01) | |
| G03B 9/08 | (2006.01) | |
| G03B 11/04 | (2006.01) | |
| H04N 7/18 | (2006.01) | |
| H04N 5/225 | (2006.01) | |
| B60R 1/06 | (2006.01) | |
| G02B 23/16 | (2006.01) | |
| G03B 17/08 | (2006.01) | |
| B60R 11/04 | (2006.01) | |
| B60S 1/56 | (2006.01) | |
| B60S 1/08 | (2006.01) | |
| B60R 11/00 | (2006.01) | |

(52) U.S. Cl.
CPC ............... *G03B 17/08* (2013.01); *B60S 1/0848* (2013.01); *H04N 5/2252* (2013.01); *B60R 2011/004* (2013.01); *B60R 11/04* (2013.01); *B60S 1/566* (2013.01)
USPC ........... 396/448; 396/452; 396/428; 348/148; 348/373; 359/507; 359/511

(58) Field of Classification Search
CPC ................... G03B 17/08; G03B 17/56; G03B 2215/0575; G02B 27/0006; G05D 1/0246; G06K 9/00791; F16M 13/00; B60R 1/062
USPC .......... 396/419, 424, 428, 448, 452; 348/113, 348/118, 120, 148, 149, 373; 359/507, 509, 359/511, 514
See application file for complete search history.

(56) References Cited

U.S. PATENT DOCUMENTS

| | | | |
|---|---|---|---|
| 2010/0027119 A1* | 2/2010 | Kollar et al. | ................... 359/507 |
| 2013/0028588 A1* | 1/2013 | Suman et al. | ................. 396/448 |

*Primary Examiner* — Rochelle-Ann J Blackman
(74) *Attorney, Agent, or Firm* — Quinn Law Group, PLLC (57) ABSTRACT

A camera system includes a body defining a cavity therein, and a camera attached to the body within the cavity and including a lens. The camera system also includes a shape memory alloy transitionable between a first state and a second state in response to a thermal activation signal, and a wiper configured for wiping debris from the lens. The wiper is attached to the camera and is actuatable by the shape memory alloy. The shape memory alloy transitions between the first state and the second state to actuate the wiper so that the wiper contacts and translates across the lens and thereby wipes debris from the lens.

12 Claims, 9 Drawing Sheets

CAMERA SYSTEM

TECHNICAL FIELD

The present disclosure relates to a camera system.

BACKGROUND

Cameras may be operated in harsh environments. For example, a lens of a security or rear-view vehicle camera may be exposed to dirt, debris, and/or moisture. Such dirt, debris, and/or moisture may diminish an image quality produced by the camera.

SUMMARY

A camera system includes a body defining a cavity therein. The camera system also includes a camera attached to the body within the cavity and having a lens. Further, the camera system includes a shape memory alloy transitionable between a first state and a second state in response to a thermal activation signal. In addition, the camera system includes a wiper configured for wiping debris from the lens, wherein the wiper is attached to the camera and actuatable by the shape memory alloy. The shape memory alloy transitions between the first state and the second state to actuate the wiper so that the wiper contacts and translates across the lens and thereby wipes debris from the lens.

In one embodiment, the camera is reversibly transitionable between a stowed position in which the camera is disposed entirely within the cavity and a deployed position in which the lens is disposed external to the cavity.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

This application incorporates by reference in its entirety U.S. Provisional Patent Application No. 61/599,213, filed on Feb. 15, 2012.

Figure 1:
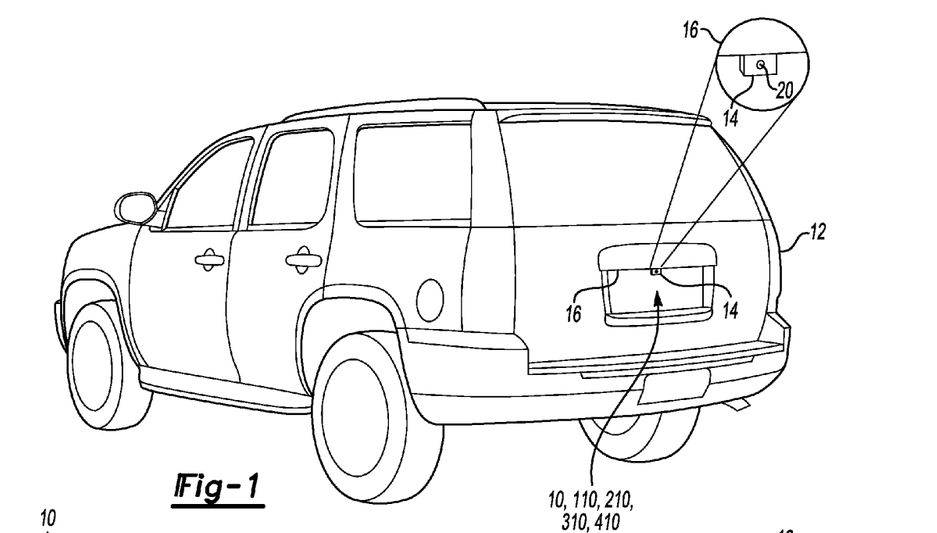
FIG. 1 is a schematic perspective illustration of a vehicle including a camera system.
Figure 2A:
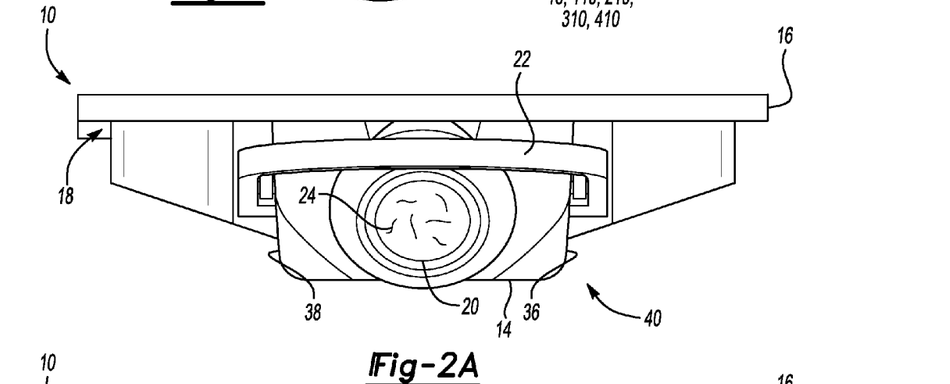
FIG. 2A is a schematic illustration of a plan view of a first embodiment of the camera system of FIG. 1, wherein the camera system includes a wiper disposed in a non-actuated position.
Figure 2B:
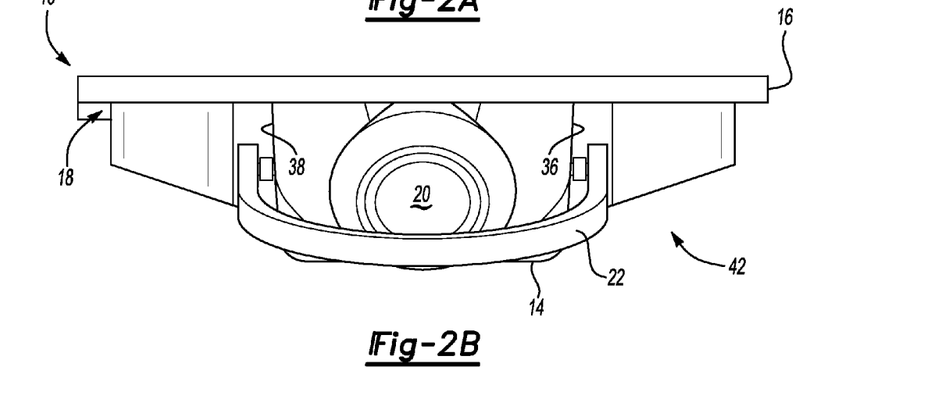
FIG. 2B is a schematic illustration of a plan view of the camera system of FIG. 2A, wherein the wiper is disposed in an actuated position.

Referring to the Figures, wherein like reference numerals refer to like elements, a camera system 10, 110, 210, 310, 410 is shown generally in FIG. 1. The camera system 10, 110, 210, 310, 410 may be useful for vehicles 12, such as automotive vehicles, that require a camera 14, e.g., a rear-view camera, operable in harsh environmental conditions. For example, the camera system 10, 110, 210, 310, 410 may be useful in dusty, dirty, icy, salty, and/or wet operating environments. As such, the camera system 10, 110, 210, 310, 410 may also be useful for non-vehicular and/or non-automotive applications including, for example, security and aviation applications.

As best described with reference to FIGS. 3A and 3B, the camera system 10 includes a body 16 defining a cavity 18 therein. For example, as shown in FIG. 1, the body 16 may be a rear hatch of the vehicle 12. Alternatively, although not shown, the body 16 may be an external housing of a security device, such as a monitoring camera.

Referring again to FIGS. 3A and 3B, the camera system 10 also includes a camera 14 attached to the body 16 within the cavity 18 and including a lens 20. Generally, the lens 20 may be an optical lens having a field of vision, e.g., in front of the camera 14, and may be configured for collecting light so that the camera 14 may produce an image. In addition, although not shown, the camera system 10 may include a plurality of cameras 14, e.g., two or more cameras 14 attached to the body 16 with a respective one of a plurality of cavities 18 (not shown).

In one embodiment, as described with reference to FIGS. 2A-10B, the camera 14 may at least partially protrude from the cavity 18 so that the lens 20 is continuously disposed external to the cavity 18. Further, the camera 14 may be fixedly attached to the body 16 such that the camera 14 does not rotate or translate with respect to the body 16. That is, the camera 14 may be stationary with respect to the body 16, and may not, for example, pivot or deploy into position during use.

In addition, referring to FIGS. 2A-12B and as set forth in more detail below, the camera system 10, 110, 210, 310, 410 includes a wiper 22, 122, 222, 322 attached to the camera 14 and configured for wiping debris (shown generally at 24 in FIG. 2A) from the lens 20. For example, the debris 24 may be water, ice, fog, dirt, dust, salt, particles, smudges, objects, and combinations thereof. As such, the wiper 22, 122, 222, 322 may clean and protect the lens 20 to ensure that a viewable image is produced by the camera 14, even during dusty, dirty, wet, and/or freezing operating conditions. Further, although not shown, the camera system 10, 110, 210, 310, 410 may include a plurality of wipers 22, 122, 222, e.g., two or more wipers 22, 122, 222 attached to the camera 14.

Figure 3A:
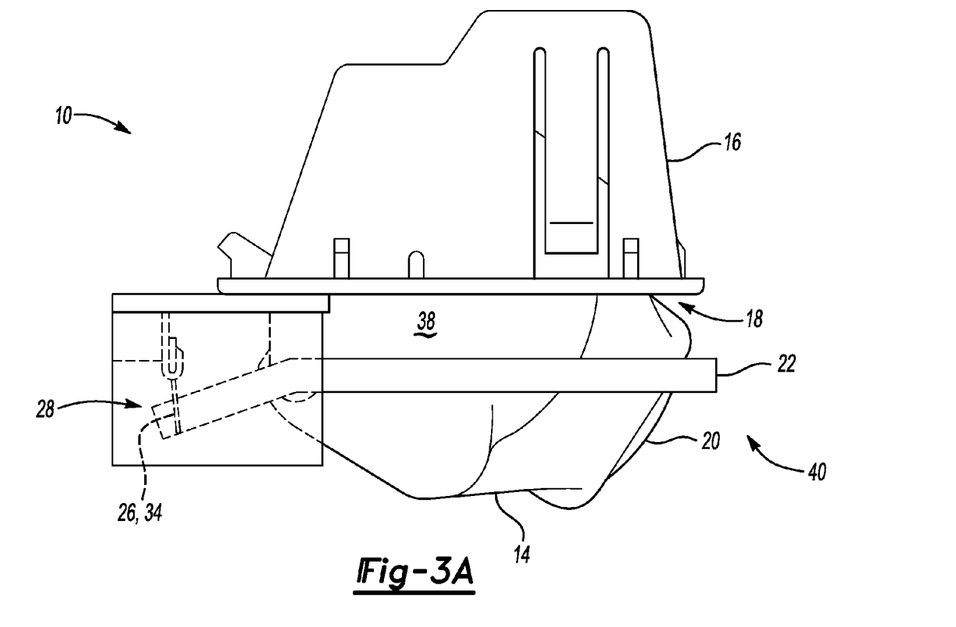
FIG. 3A is a schematic illustration of a side view of the camera system of FIG. 2A.
Figure 3B:
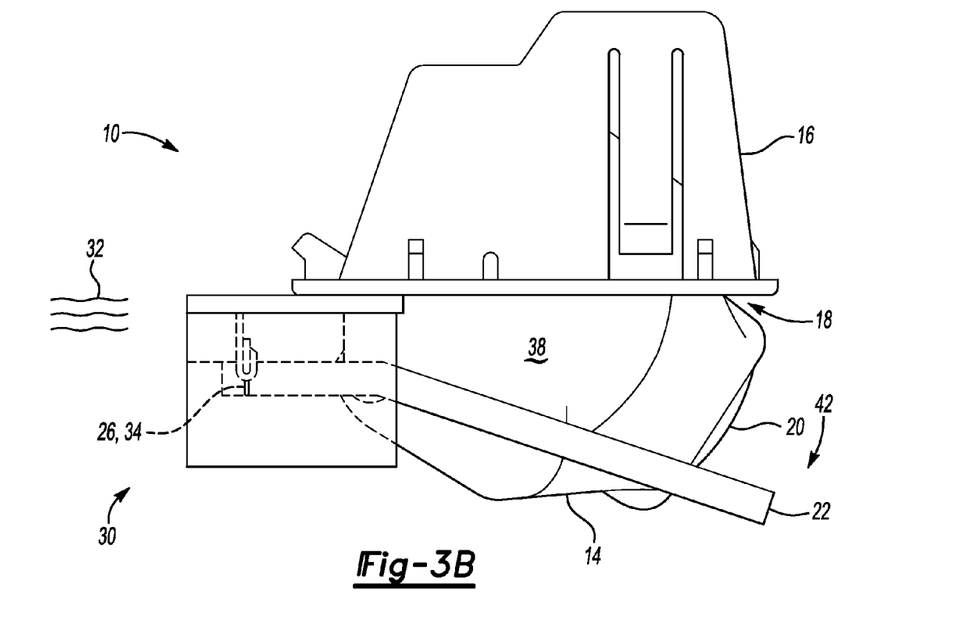
FIG. 3B is a schematic illustration of a side view of the camera system of FIG. 2B.
Figure 4:
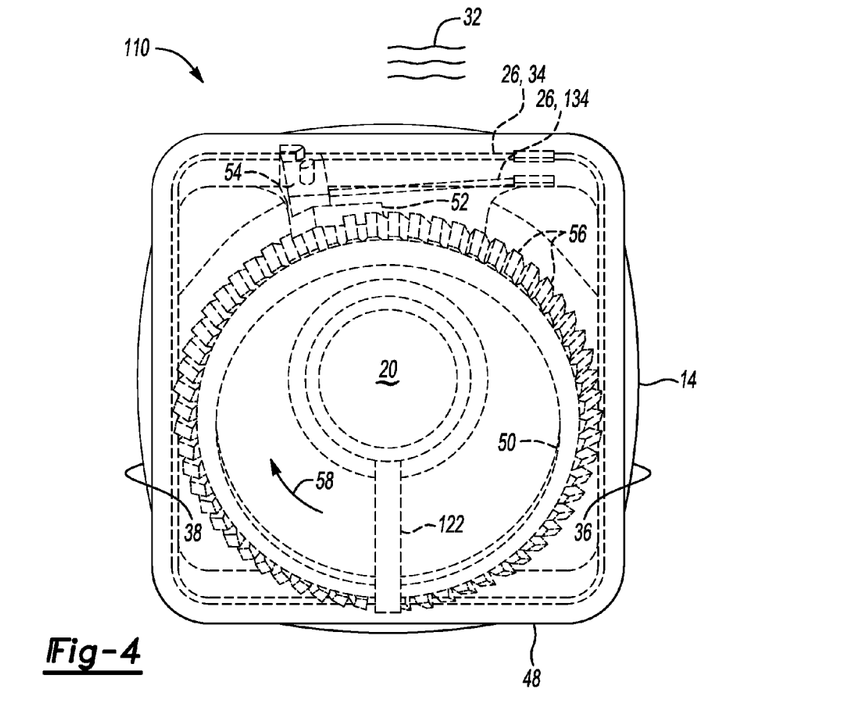
FIG. 4 is a schematic illustration of a plan view of a second embodiment of the camera system of FIG. 1.
Figure 5:
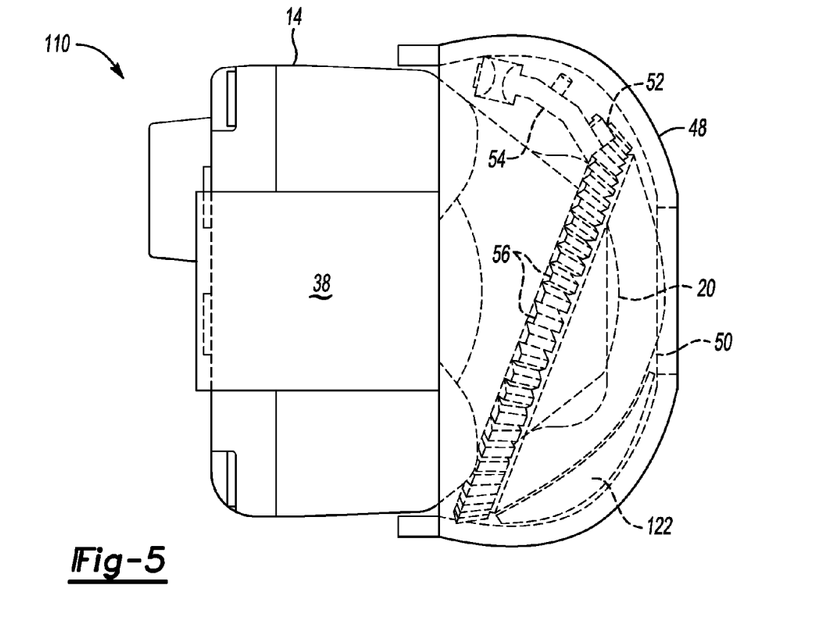
FIG. 5 is a schematic illustration of a side view of the camera system of FIG. 4.
Figure 6A:
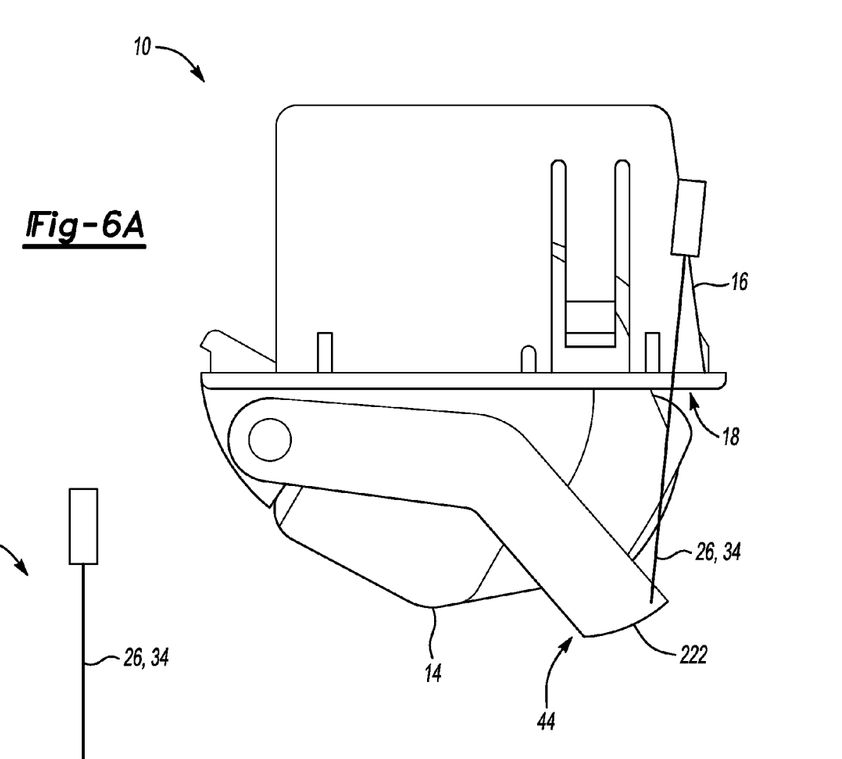
FIG. 6A is a schematic illustration of a side view of another embodiment of the wiper of FIGS. 2A-3B, wherein the wiper is disposed in an actuated position, and is actuated by a shape memory alloy configured as a wire and attached to the wiper at a first location.
Figure 6B:
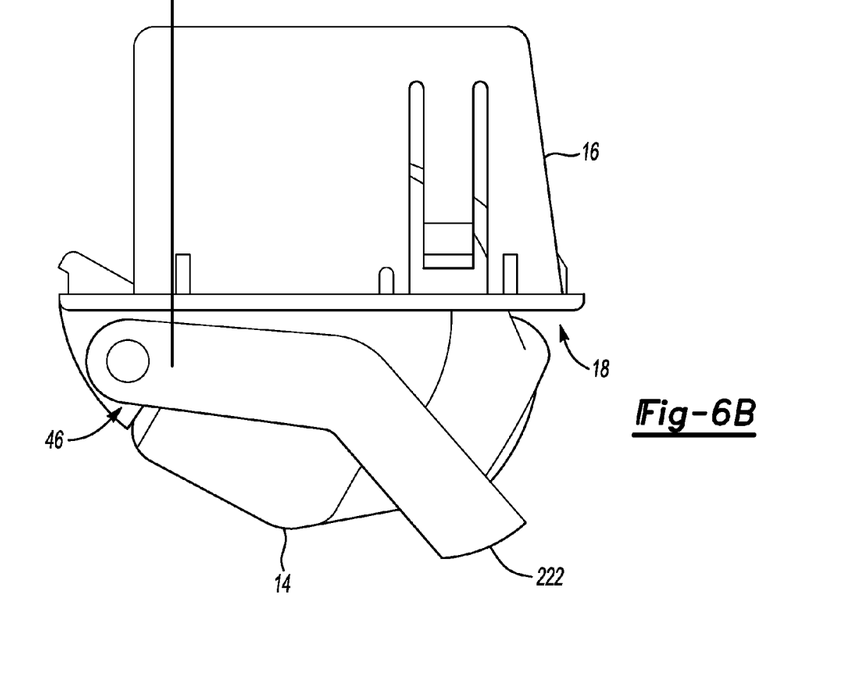
FIG. 6B is a schematic illustration of a side view of the camera system of FIG. 6A, wherein the wire is attached to the wiper at a second location.

Referring now to FIGS. 2A-9, the wiper 22, 122, 222 may be continuously disposed external to the cavity 18. That is, the wiper 22, 122, 222 may be visible at all times from a vantage point external to the camera system 10, 110, 210. Alternatively, as shown by comparing FIGS. 10A and 10B, the wiper 322 may be only periodically or intermittently disposed external to the cavity 18, as set forth in more detail below. Further, as shown in FIGS. 2A-3B and 6A-10B, the wiper 22, 222, 322 may translate or pivot, i.e., may move, with respect to the camera 14. Alternatively, as shown in FIGS. 4 and 5, the wiper 122 may be stationary with respect to the camera 14 and may not translate or pivot with respect to the camera 14. That is, the wiper 122 may be fixed with respect to the camera 14, as also set forth in more detail below.

As best shown in FIGS. 3A-4, 6A-8B, and 10A-12B, the camera system 10, 110, 210, 310, 410 further includes a shape memory alloy 26 transitionable between a first state (shown generally at 28 in FIGS. 3A, 7B, 8B, 10A, 11A, and 12A) and a second state (shown generally at 30 in FIGS. 3B, 7A, 8A, 10B, 11B, and 12B) in response to a thermal activation signal (shown generally at 32 in FIGS. 3B, 4, 7A, 10B, 11B, and 12B), e.g., heat. Therefore, as set forth in more detail below, the shape memory alloy 26 transitions between the first state 28 and the second state 30 to actuate the wiper 22, 122, 222, 322 so that the wiper 22, 122, 222, 322 contacts and translates across the lens 20 and thereby wipes debris 24 (FIG. 2A) from the lens 20.

As used herein, the terminology "shape memory alloy 26" refers to alloys that exhibit a shape memory effect and have the capability to quickly change properties in terms of stiffness, spring rate, and/or form stability. That is, the shape memory alloy 26 may undergo a solid state crystallographic phase change via molecular or crystalline rearrangement to shift between a martensite phase, i.e., "martensite", and an austenite phase, i.e., "austenite". That is, the shape memory alloy 26 may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. Further, the martensite phase generally refers to the comparatively lower-temperature phase and is often more deformable than the comparatively higher-temperature austenite phase.

The temperature at which the shape memory alloy 26 begins to change from the austenite phase to the martensite phase is known as the martensite start temperature, $M_s$. The temperature at which the shape memory alloy 26 completes the change from the austenite phase to the martensite phase is known as the martensite finish temperature, $M_f$, or transformation temperature, $T_{trans}$. Similarly, as the shape memory alloy 26 is heated, the temperature at which the shape memory alloy 26 begins to change from the martensite phase to the austenite phase is known as the austenite start temperature, $A_s$. The temperature at which the shape memory alloy 26 completes the change from the martensite phase to the austenite phase is known as the austenite finish temperature, $A_f$, or transformation temperature, $T_{trans}$.

The shape memory alloy 26 may have any suitable form, i.e., shape. For example, the shape memory alloy 26 may be configured as a shape-changing element such as a wire 34 (FIG. 3A), spring, tape, band, continuous loop, and combinations thereof. Further, the shape memory alloy 26 may have any suitable composition. In particular, the shape memory alloy 26 may include in combination an element selected from the group of cobalt, nickel, titanium, indium, manganese, iron, palladium, zinc, copper, silver, gold, cadmium, tin, silicon, platinum, and gallium. For example, suitable shape memory alloys 26 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy 26 can be binary, ternary, or any higher order so long as the shape memory alloy 26 exhibits a shape memory effect, e.g., a change in shape orientation, damping capacity, and the like. Generally, the shape memory alloy 26 may be selected according to desired operating temperatures of the camera system 10, 110, 210, 310, 410. In one specific example, the shape memory alloy 26 may include nickel and titanium.

Therefore, in one example described with reference to FIGS. 3A and 3B, the shape memory alloy 26 may be configured as a wire 34. The wire 34 formed from the shape memory alloy 26 may be characterized by the first state 28, i.e., when a temperature of the shape memory alloy 26 is below the martensite finish temperature, $M_f$, or transformation temperature, $T_{trans}$, of the shape memory alloy 26. Likewise, the wire 34 formed from the shape memory alloy 26 may also be characterized by the second state 30, i.e., when the temperature of the shape memory alloy 26 is above the austenite finish temperature, $A_f$, or transformation temperature, $T_{trans}$, of the shape memory alloy 26. In addition, as described with reference to FIGS. 7A-8B and 10A-12B, the camera system 10, 210, 310, 410 may include a plurality of shape memory alloys 26 and/or a plurality of wires 34, 134.

In a first embodiment, as described with reference to FIGS. 2A-3B, the camera 14 may have a first external surface 36 and a second external surface 38 spaced apart from the first external surface 36. For example, the camera 14 may have a box-like configuration. Further, the wiper 22 may be pivotably attached to the first external surface 36 and the second external surface 38 so that the wiper 22 is disposed in periodic contact with the lens 20. That is, the wiper 22 may be configured as a bar that pivots between a non-actuated position (shown generally at 40 in FIG. 2A) in which the wiper 22 does not contact the lens 20, and an actuated position (shown generally at 42 in FIG. 2B) in which the wiper 22 contacts and translates across the lens 20 to thereby wipe debris 24 (FIG. 2A) from the lens 20. As such, the wiper 22 may be disposed in periodic contact with the lens 20.

Referring to FIGS. 3A and 3B, for this embodiment, the shape memory alloy 26 may be configured as the wire 34 attached to the wiper 22 and may contract in length in response to the thermal activation signal 32 (FIG. 3B) to thereby translate the wiper 22 across the lens 20. That is, the shape memory alloy 26 may transition from the first state 28 (FIG. 3A), e.g., a cold state, to the second state 30 (FIG. 3B), e.g., a hot state, and the wire 34 may accordingly contract in length. As the wire 34 contracts in length in response to the thermal activation signal 32, the wire 34 may actuate, e.g., pull on, the wiper 22 to thereby translate the wiper 22 across the lens 20. After wiping the lens 20, the thermal activation signal 32 may be removed from the wire 34, and the shape memory alloy 26 may relax so that the wire 34 elongates in length and thereby returns the wiper 22 to the non-actuated position 40 (FIG. 3A). That is, the thermal activation signal 32 may be removed from the wire 34 so that the shape memory alloy 26 transitions from the second state 30 (FIG. 3B), e.g., the hot state, to the first state 28 (FIG. 3A), e.g., the cold state, and thereby returns the wiper 22 to the non-actuated position 40.

For any of the embodiments described herein, the shape memory alloy 26 may be actuated by exposing the shape memory alloy 26 to the thermal activation signal 32. Further, for vehicle 14 (FIG. 1) and stationary monitoring system (not shown) applications, actuation of the shape memory alloy 26 may be automatically triggered by sensors configured to detect, for example, temperature, water, ice, dust, and the like. Alternatively or additionally, the shape memory alloy 26 may be automatically triggered upon vehicle 14 or security monitoring system start-up, or, for example, when the vehicle 14 shifts into reverse, activates a turn signal, etc. Furthermore, the shape memory alloy 26 may be triggered solely upon operator input, i.e., on demand as determined by an operator.

Figure 7A:
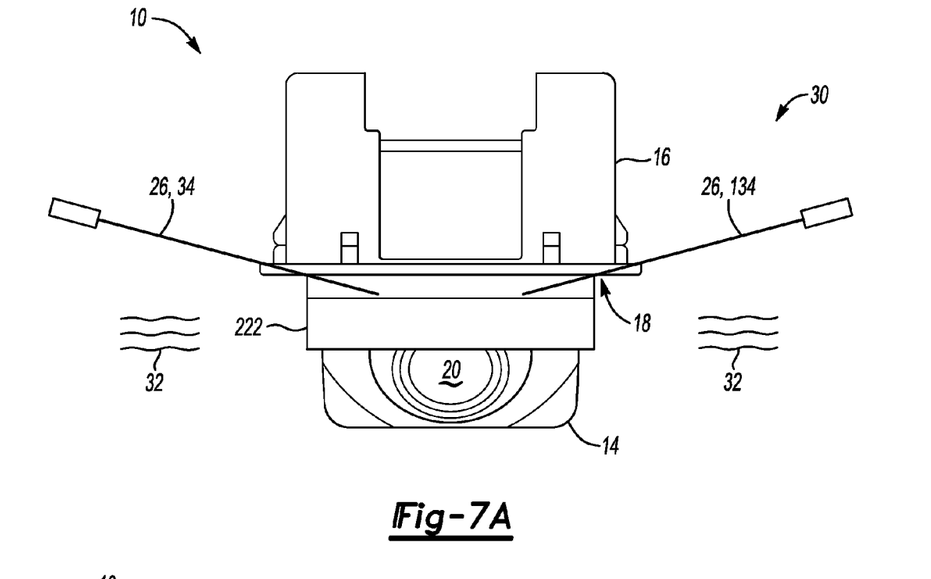
FIG. 7A is a schematic illustration of a plan view of another configuration of the camera system of FIG. 6A, wherein the shape memory alloy is configured as a plurality of wires attached to the wiper at a third location.
Figure 7B:
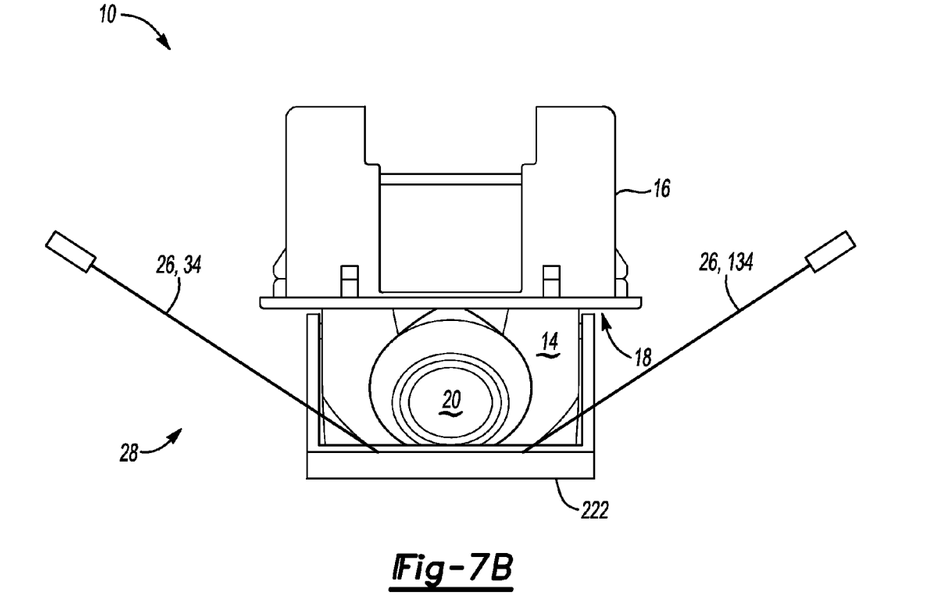
FIG. 7B is a schematic illustration of a plan view of the camera system of FIG. 7A, wherein the wiper is disposed in an actuated position.

Referring now to FIGS. 6A-7B, the wire 34 may be attached to the wiper 222 in any manner and at any location. For example, the wire 34 may be attached to the wiper 222 at a proximal end 44 (FIG. 6A) or a distal end 46 (FIG. 6B) of the wiper 22. Further, as shown in FIGS. 7A and 7B, the shape memory alloy 26 may be configured as a plurality of wires 34, 134 that may be arranged in a bowstring configuration.

Referring now to FIGS. 4 and 5, in a second embodiment, the camera 14 may also have the first external surface 36 and the second external surface 38 spaced apart from the first external surface 36, as set forth above. In addition, the camera system 110 may further include a first transparent cover 48 attached to the first external surface 36 and the second external surface 38. For example, the first transparent cover 48 may be spaced opposite the lens 20 and snap onto the camera 14 along the first external surface 36 and the second external surface 38. That is, the first transparent cover 48 may be attached to the camera 14 via an interference fit. The first transparent cover 48 may therefore cover and protect the lens 20 of the camera 14.

With continued reference to FIGS. 4 and 5, for this embodiment, the lens 20 of the camera 14 may include a second transparent cover 50 disposed between the camera 14 and the first transparent cover 48. Further, as best shown in FIG. 5, the wiper 122 may be disposed between and in contact with the first transparent cover 48 and the second transparent cover 50. For example, the wiper 122 may be fixedly attached to the first transparent cover 48 and may be configured for wiping the second transparent cover 50 of the lens 20.

In addition, as shown in FIGS. 4 and 5, the camera system 110 may further include a ratchet apparatus 52 attached to the second transparent cover 50. In one example as shown in FIG. 4, the ratchet apparatus 52 may include an arm 54 configured to iteratively mesh with a plurality of teeth 56 disposed along a circumference of the second transparent cover 50. For this embodiment, the shape memory alloy 26 may actuate the ratchet apparatus 52 by transitioning between the first state 28 (not shown) and the second state 30 (not shown) so that the second transparent cover 50 contacts and rotates across the wiper 122 to thereby wipe debris 24 (FIG. 2A) from the second transparent cover 50. That is, the shape memory alloy 26 may be configured as the wire 34 and may be intermittently exposed to the thermal activation signal 32 (FIG. 4) so as to alternatingly transition from the first state 28 to the second state 30, and from the second state 30 back to the first state 28.

In particular, with continued reference to FIGS. 4 and 5, as the shape memory alloy 26 transitions from the first state 28 (not shown), e.g., the cold state, to the second state 30 (not shown), e.g., the hot state, upon exposure to the thermal activation signal 32 (FIG. 4), the wire 34 may contract in length and pull the arm 54 from one tooth 56 to an adjacent tooth 56 and thereby cause the second transparent cover 50 to rotate, e.g., in a counterclockwise direction 58 (FIG. 4). Thereafter, once the second transparent cover 50 has rotated sufficiently along a desired path, the thermal activation signal 32 may be removed from the wire 34 and the shape memory alloy 26 may transition from the second state 30 to the first state 28 so that the arm 54 may lodge between adjacent teeth 56 and prevent further rotation of the second transparent cover 50. Therefore, the second transparent cover 50 may rotate in a ratcheting manner about the wiper 122. That is, although the wiper 122 is stationary for this embodiment, the wiper 122 may nonetheless wipe debris 24 (FIG. 2A) from the second transparent cover 50, i.e., the lens 20, to thereby protect and clean the lens 20.

Figure 10A:
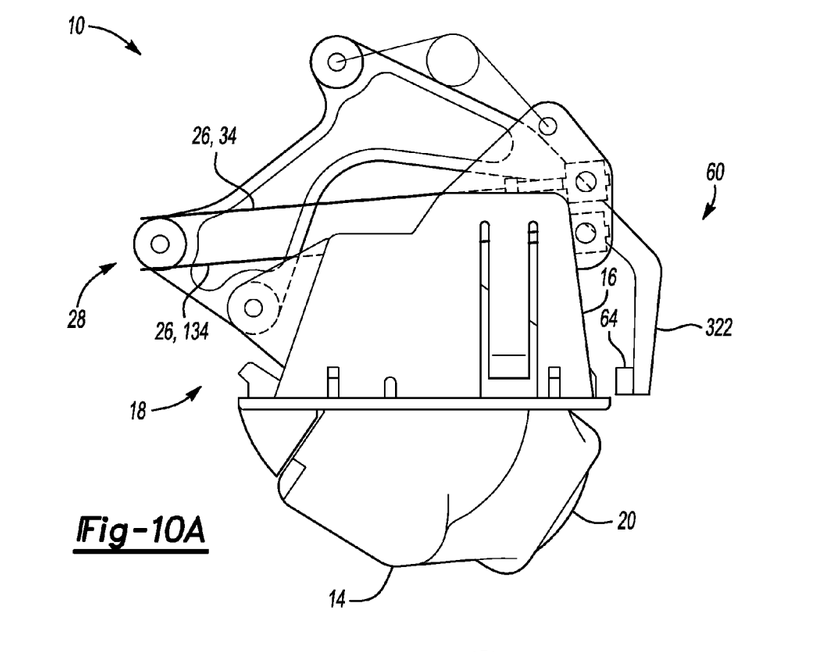
FIG. 10A is a schematic illustration of a side view of a further embodiment of the wiper of FIGS. 2A-3B, wherein the wiper is disposed in a stowed position.
Figure 10B:
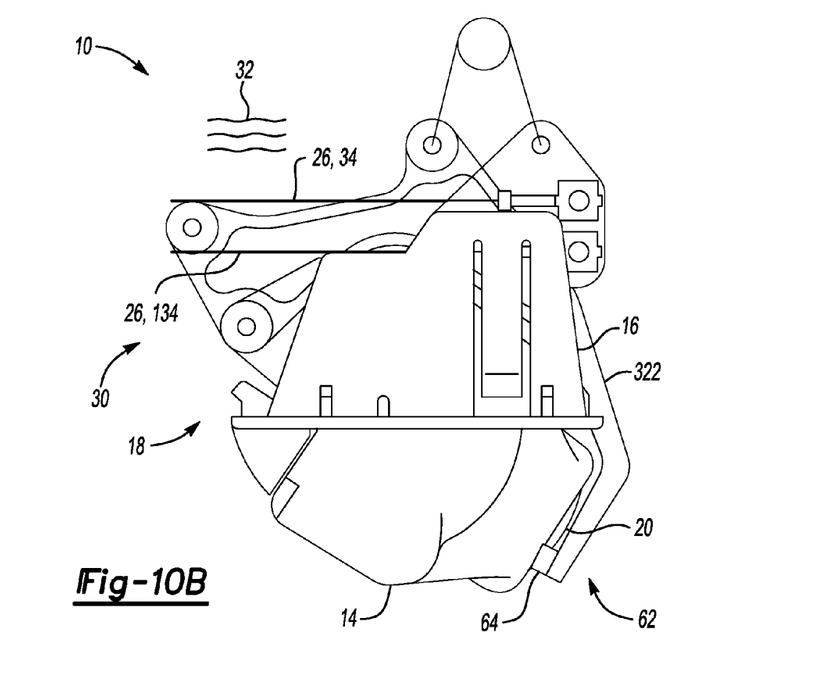
FIG. 10B is a schematic illustration of a side view of the camera system of FIG. 10A, wherein the wiper is disposed in a deployed position.

Referring now to FIGS. 10A and 10B, in another embodiment, the wiper 322 may be reversibly transitionable between a stowed position 60 (FIG. 10A) in which the wiper 322 is disposed entirely within the cavity 18, and a deployed position 62 (FIG. 10B) in which the wiper 322 at least partially extends from the cavity 18 and contacts the lens 20. That is, as shown in FIG. 10A, when the wiper 322 is disposed in the stowed position 60, the wiper 322 may not be visible to an observer external to the camera system 10 because the wiper 322 is entirely retracted into the cavity 18. For this embodiment, the wiper 322 may have an articulated configuration and may include a tip 64 configured for contacting and translating across the lens 20 to thereby wipe debris 24 (FIG. 2A) from the lens 20.

With continued reference to FIGS. 10A and 10B, for this embodiment, the shape memory alloy 26 may also be configured as the wire 34 attached to the wiper 322. The wire 34 may contract in length in response to the thermal activation signal 32 (FIG. 10B) to thereby transition the wiper 322 from the stowed position 60 (FIG. 10A) to the deployed position 62 (FIG. 10B). That is, the shape memory alloy 26 may transition from the first state 28 (FIG. 10A), e.g., a cold state, to the second state 30 (FIG. 10B), e.g., a hot state, and the wire 34 may accordingly contract in length. As the wire 34 contracts in length in response to the thermal activation signal 32, the wire 34 may actuate, e.g., pull on, the wiper 322 to thereby transition the wiper 322 to the deployed position 62 and translate the wiper 322 across the lens 20. After wiping the lens 20, the thermal activation signal 32 may be removed from the wire 34, and the shape memory alloy 26 may relax so that the wire 34 elongates in length and thereby returns the wiper 322 to the stowed position 60. That is, the thermal activation signal 32 may be removed from the wire 34 so that the shape memory alloy 26 transitions from the second state 30, e.g., the hot state, to the first state 28, e.g., the cold state, and thereby returns the wiper 322 to the stowed position 60.

Figures 8A, 8B, 9:
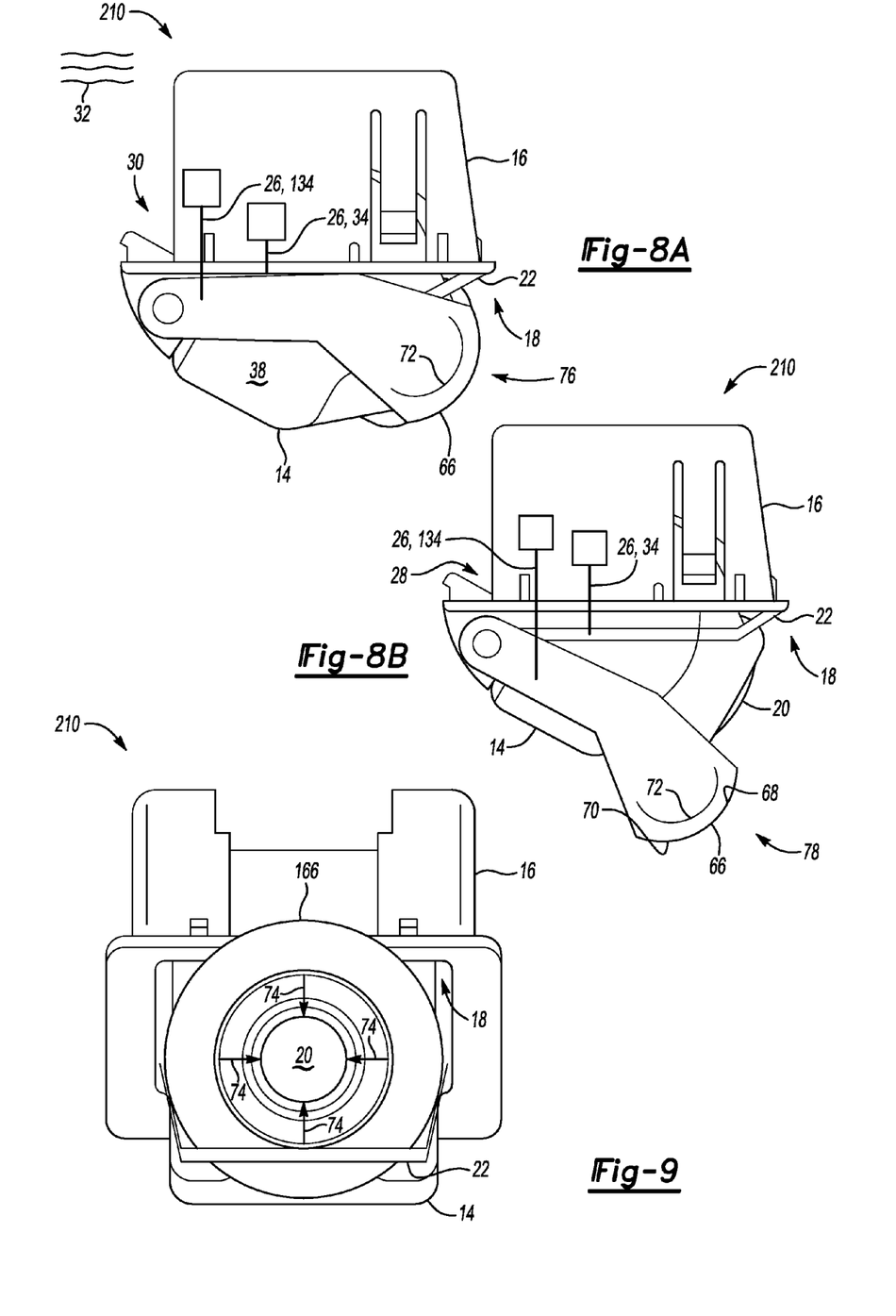
FIG. 8A is a schematic illustration of a side view of a third embodiment of the camera system of FIG. 1, wherein the camera system includes a shutter obscuring a lens.
FIG. 8B is a schematic illustration of a side view of the camera system of FIG. 8A, wherein the shutter does not obscure the lens.
FIG. 9 is a schematic illustration of a plan view of another embodiment of the shutter of FIGS. 8A and 8B.

In yet another embodiment, as described with reference to FIGS. 8A-9, the camera system 210 may further include a shutter 66, 166 attached to the camera 14 and configured for selectively obscuring the lens 20. That is, the shutter 66, 166 may alternatingly obscure the lens 20 to thereby protect the lens 20 from debris 24 (FIG. 2A) when the shape memory alloy 26 transitions to the second state 30 (FIG. 8A), and may translate away from the lens 20 to thereby uncover the lens 20 when the shape memory alloy 26 transitions to the first state 28 (FIG. 8B). The shutter 66, 166 may have any configuration. For example, as shown in FIGS. 8A and 8B, the shutter 66 may be pivotably attached to the first external surface 36 (not shown) and the second external surface 38 of the camera 14, and may pivot across the lens 20 during operation. Referring again to FIG. 8B, the shutter 66 may have an internal surface 68 spaced opposite the lens 20 and an external surface 70 spaced opposite the internal surface 68, and may include a mirror 72 disposed on the internal surface 68 and configured for reflecting light to the lens 20. That is, since the camera 14 is stationary with respect to the body 16 for this embodiment, as set forth above, once the shutter 66 pivots so as to not obscure the lens 20, light may reflect off the mirror 72 into the lens 20.

Alternatively, as shown in FIG. 9, in an open or non-obscuring position, the shutter 166 may be configured as an annular ring that is concentric with the lens 20. In this example, upon actuation, the shutter 166 may close upon the lens 20 in the direction of arrows 74.

Referring again to FIGS. 8A and 8B, the shape memory alloy 26 may be configured as the wire 34 attached to the wiper 22. Likewise, an additional wire 134 may attach to the shutter 66. The wire 134 may transition the shutter 66 from an obscuring position 76 (FIG. 8A) to a non-obscuring position 78 (FIG. 8B). That is, the shape memory alloy 26 may transition from the second state 30 (FIG. 8A), e.g., a cold state, to the first state 28 (FIG. 8B), e.g., a hot state, and the wire 134 may accordingly contract in length. As the wire 134 contracts in length in response to the thermal activation signal 32, the wire 134 may actuate, e.g., pull on, the shutter 66 to thereby transition the shutter 66 to the obscuring position 76. After uncovering the lens 20, the thermal activation signal 32 may be removed from the wire 134, and the shape memory alloy 26 may relax so that the wire 134 elongates in length and thereby returns the shutter 66 to the non-obscuring position 78. That is, the thermal activation signal 32 may be removed from the wire 134 so that the shape memory alloy 26 transitions from the second state 30, e.g., the hot state, to the first state 28, e.g., the cold state, and thereby returns the shutter 66 to the non-obscuring position 78.

Referring now to FIGS. 11A-12B, in one embodiment, the camera 14 is reversibly transitionable between the stowed position 60 (FIGS. 11A and 12A) in which the camera 14 is disposed entirely within the cavity 18, and the deployed position 62 (FIGS. 11B and 12B) in which the lens 20 is disposed external to the cavity 18. That is, the camera 14 may pivot into the cavity 18 and be hidden from view to an observer external to the body 16 when the camera 14 is not in use.

Figure 11A:
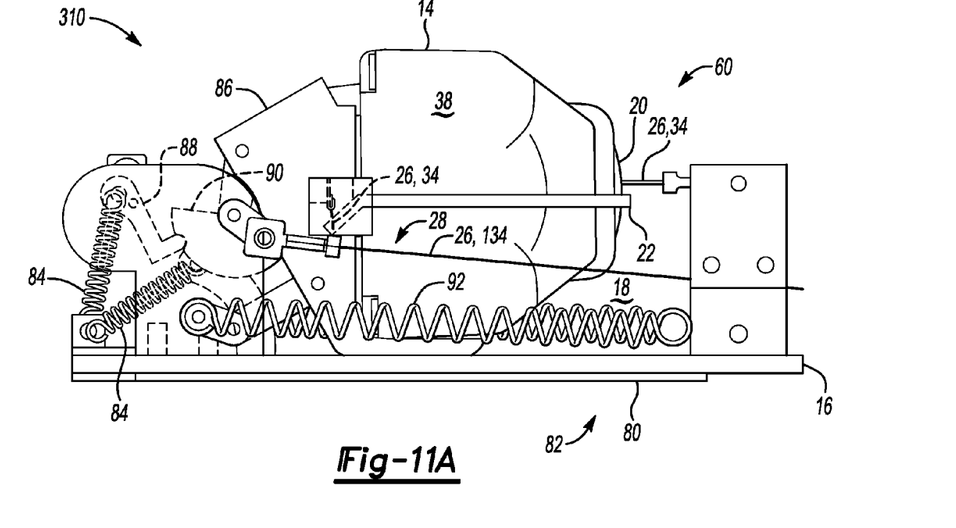
FIG. 11A is a schematic illustration of a side view of a fourth embodiment of the camera system of FIG. 1, wherein the camera is disposed in a stowed position.
Figure 11B:
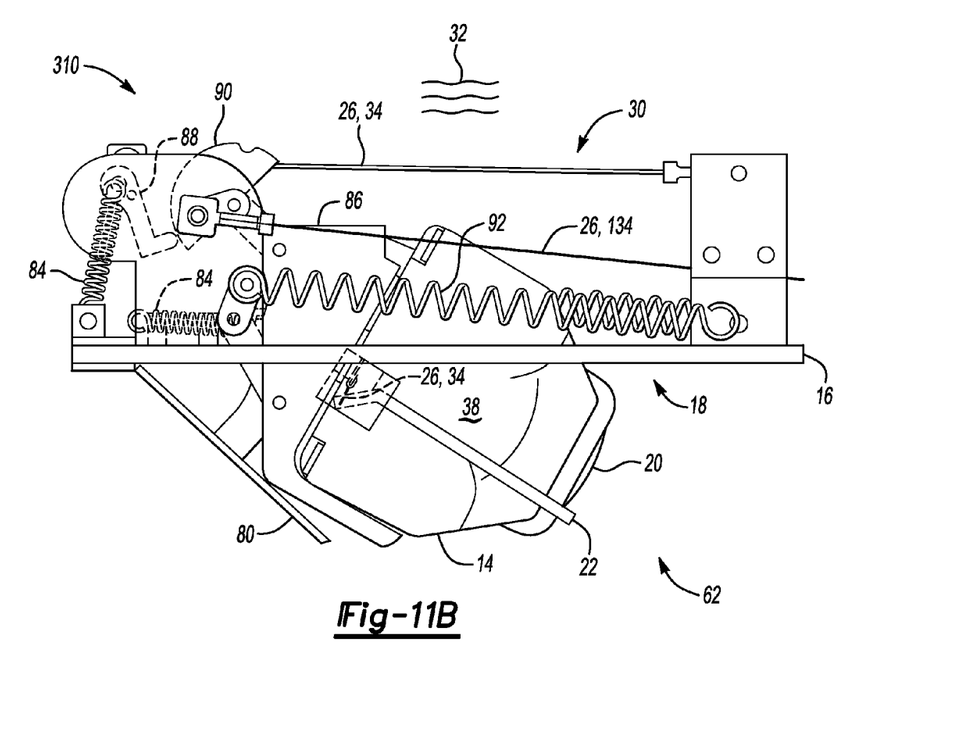
FIG. 11B is a schematic illustration of a side view of the camera system of FIG. 11A, wherein the camera is disposed in a deployed position.
Figure 12A:
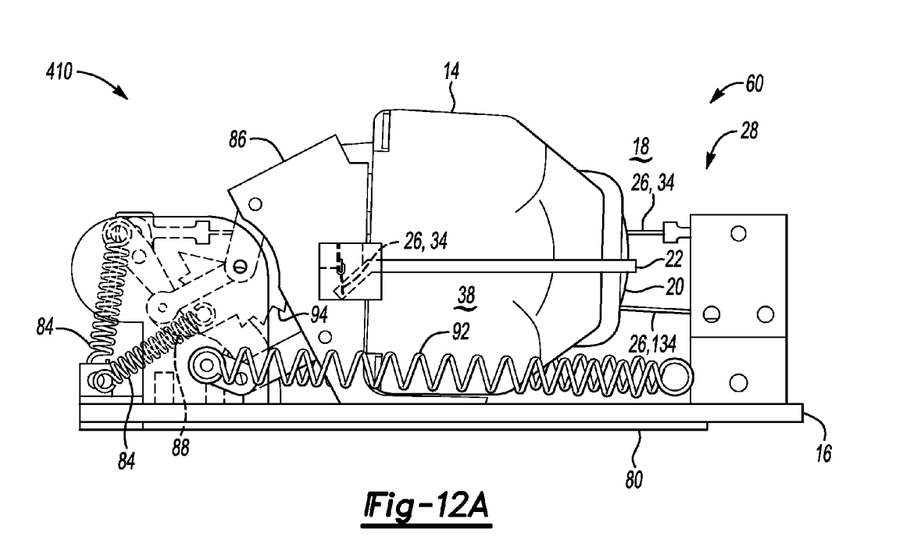
FIG. 12A is a schematic illustration of a side view of a fifth embodiment of the camera system of FIG. 1, wherein the camera is disposed in a stowed position.

To that end, as described with continued reference to FIGS. 11A-12B, the camera system 310, 410 may further include a door 80 attached to the body 16 and configured for covering the cavity 18 when the camera 14 is disposed in the stowed position 60 (FIGS. 11A and 12A). That is, the door 80 may conceal the camera 14 from view when the camera 14 is recessed into the cavity 18. The door 80 may be spring-loaded to bias to a closed position 82 (FIG. 11A) by one or more holding springs 84. Further, the camera system 310, 410 may include a carrier 86 attached to the camera 14 and pivotably attached to the body 16. For example, the carrier 86 may be attached to the first external surface 36 (not shown) and the second external surface 38 of the camera 14 and may support the camera 14 in both the stowed and deployed positions 60, 62.

In addition, as best shown in FIGS. 11A and 11B, the camera system 310 may also include a detent latch 88 configured for alternatingly contacting the carrier 86 to retain the camera 14 in the stowed position 60 (FIG. 11A), and translating away from the carrier 86 to transition the camera 14 to the deployed position 62 (FIG. 11B). For example, the carrier 86 may include a rotatable element 90, and the detent latch 88 may be shaped to mate with the rotatable element 90. Further, the shape memory alloy 26 may be configured as the wire 34 attached to the rotatable element 90. As the shape memory alloy 26 is exposed to the thermal activation signal 32 (FIG. 11B), the wire 34 may contract in length in response to the thermal activation signal 32 to release the detent latch 88 from the rotatable element 90 of the carrier 86. That is, the wire 34 may contract in length such that the rotatable element 90 rotates away from the detent latch 88 and the camera 14 is partially released from the stowed position 60 (FIG. 11A).

As further shown in FIGS. 11A and 11B, the camera system 310 may also include a resilient member 92, e.g., a spring, attached to the body 16 and the carrier 86 and configured for transitioning the camera 14 to the deployed position 62 (FIG. 11B). That is, after the detent latch 88 is released from the rotatable element 90 as set forth above, the resilient member 92 may overpower the one or more holding springs 84 to thereby open the door 80 and transition, e.g., pivot, translate, and/or slide, the camera 14 to the deployed position 62.

As best shown in FIG. 11B, the camera system 310 may include a second wire 134 formed from the shape memory alloy 26 and configured for transitioning the camera 14 to the stowed position 60 (FIG. 11A). That is, after deployment, the shape memory alloy 26 configured as the wire 134 attached to the carrier 86 may contract in length in response to the thermal activation signal 32 to transition the camera 14 to the stowed position 60. That is, the wire 134 may pull the camera back into the cavity 18, and the holding springs 84 may close the door 80 so that the camera 14 is stowed and concealed from view.

Figure 12B:
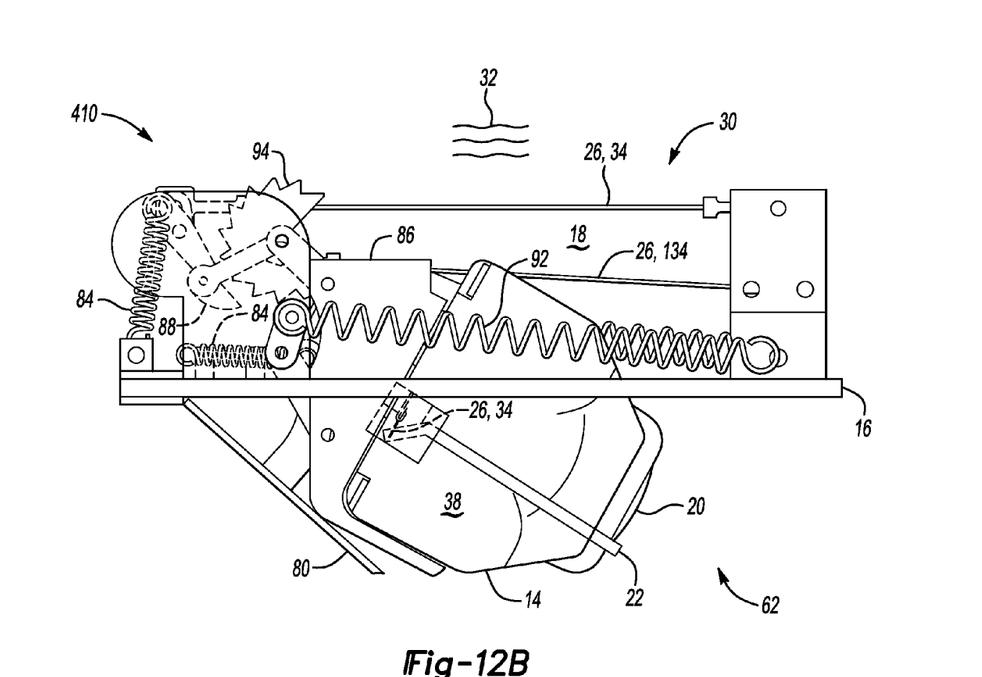
FIG. 12B is a schematic illustration of a side view of the camera system of FIG. 12A, wherein the camera is disposed in a deployed position.

Referring now to FIGS. 12A and 12B, the camera system 410 may further include a ratchet assembly 94 attached to the carrier 86 and configured for transitioning the camera 14 to the stowed position 60 (FIG. 12A). For this embodiment, as set forth above, the wire 134 may contract as the shape memory alloy 26 is exposed to the thermal activation signal 32 (FIG. 12B) to release the detent latch 88 from the ratchet assembly 94. That is, the wire 134 may contract in length such that the ratchet assembly 94 rotates away from the detent latch 88 and the camera 14 is partially released from the stowed position 60.

As shown in FIGS. 12A and 12B, after the detent latch 88 is released from the ratchet assembly 94, the resilient member 92 may overpower the one or more holding springs 84 to thereby open the door 80 and transition, e.g., pivot, translate, and/or slide, the camera 14 to the deployed position 62 (FIG. 12B).

As best shown in FIG. 12B, the camera system 410 may include the second wire 134 formed from the shape memory alloy 26 and configured for transitioning the camera 14 to the stowed position 60 (FIG. 12A). That is, after deployment, the shape memory alloy 26 configured as the wire 134 attached to the ratchet assembly 94 may contract in length in response to the thermal activation signal 32 to transition the camera 14 to the stowed position 60. In particular, the wire 134 may actuate the ratchet assembly 94 and may pull the camera back into the cavity 18. The holding springs 84 may close the door 80 so that the camera 14 is stowed and concealed from view.

The aforementioned camera system 10, 110, 210, 310, 410 provides excellent image quality and lens life for cameras 14 exposed to harsh environmental conditions. That is, the camera system 10, 110, 210, 310, 410 provides cleaning, stowing, wiping, and protection functionality for the camera 14 exposed to dirt, dust, debris, ice, snow, water, and the like. In particular, the shape memory alloy 26 may optimize a performance and functionality of cameras 14 exposed to the elements during operation. More specifically, actuation of the wiper 22, 122, 222, 322, second transparent cover 50, shutter 66, 166, carrier 86, and/or ratchet assembly 94 may protect, clean, and/or stow the camera 14. By cleaning, protecting, and/or stowing the camera 14, the lens 20 may be kept free from debris, dust, and/or ice build-up so that the lens 20 and camera 14 may provide optimized image quality. Further, the shape memory alloy 26 may decrease a weight of the camera system 10, 110, 210, 310, 410 as compared to other camera systems (not shown). In addition, the shape memory alloy 26 is economical and may be tightly packaged to provide the aforementioned advantages. That is, the shape memory alloy 26 may provide an easily-packaged actuator for the camera 14 and allows for, for example, on-vehicle cameras 14 that are configured to provide an excellent image quality without frequent cleaning and/or maintenance.

While the best modes for carrying out the present invention have been described in detail, those familiar with the art to which this invention relates will recognize various alternative designs and embodiments for practicing the invention within the scope of the appended claims.

The invention claimed is:

1. A camera system comprising:
a body defining a cavity therein;
a camera attached to the body within the cavity and including a lens, wherein the camera at least partially protrudes from the cavity so that the lens is continuously disposed external to the cavity;
a shape memory alloy transitionable between a first state and a second state in response to a thermal activation signal; and
a wiper configured for wiping debris from the lens, wherein the wiper is attached to and stationary with respect to the camera, is continuously disposed external to the cavity, and is actuatable by the shape memory alloy;
wherein the shape memory alloy transitions between the first state and the second state to actuate the wiper so that the wiper contacts and translates across the lens and thereby wipes debris from the lens.

2. The camera system of claim 1, wherein the camera is fixedly attached to the body such that the camera does not rotate or translate with respect to the body.

3. The camera system of claim 1, wherein the camera has a first external surface and a second external surface spaced apart from the first external surface, and further wherein the wiper is pivotably attached to the first external surface and the second external surface so that the wiper is disposed in periodic contact with the lens.

4. The camera system of claim 3, wherein the shape memory alloy is configured as a wire attached to the wiper and contracts in length in response to the thermal activation signal to thereby translate the wiper across the lens.

5. The camera system of claim 1, wherein the camera has a first external surface and a second external surface spaced apart from the first external surface, and further wherein the camera system further includes a first transparent cover attached to the first external surface and the second external surface.

6. The camera system of claim 5, wherein the lens includes a second transparent cover disposed between the camera and the first transparent cover.

7. The camera system of claim 6, wherein the wiper is disposed between and in contact with the first transparent cover and the second transparent cover.

8. The camera system of claim 7, wherein the camera system further includes a ratchet apparatus attached to the second transparent cover, and further wherein the shape memory alloy actuates the ratchet apparatus by transitioning between the first state and the second state such that the second transparent cover contacts and rotates across the wiper to thereby wipe debris from the second transparent cover.

9. A camera system comprising:
a body defining a cavity therein;
a camera fixedly attached to the body within the cavity such that the camera does not rotate or translate with respect to the body, wherein the camera includes a lens and at least partially protrudes from the cavity so that the lens is continuously disposed external to the cavity;
a shape memory alloy transitionable between a first state and a second state in response to a thermal activation signal;
a wiper configured for wiping debris from the lens, wherein the wiper is attached to the camera and actuatable by the shape memory alloy;
wherein the shape memory alloy transitions between the first state and the second state to actuate the wiper so that the wiper contacts and translates across the lens and thereby wipes debris from the lens; and
a shutter attached to the camera and configured for selectively obscuring the lens, wherein the shutter alternatingly obscures the lens to thereby protect the lens from debris when the shape memory alloy transitions to the second state, and translates away from the lens to thereby uncover the lens when the shape memory alloy transitions to the first state;
wherein the shutter has an internal surface spaced opposite the lens, and an external surface spaced opposite the internal surface, and includes a mirror disposed on the internal surface and configured for reflecting light to the lens.

10. A camera system comprising:
a body defining a cavity therein;
a camera attached to the body within the cavity and including a lens;
wherein the camera is reversibly transitionable between a stowed position in which the camera is disposed entirely within the cavity and a deployed position in which the lens is disposed external to the cavity;
a shape memory alloy transitionable between a first state and a second state in response to a thermal activation signal;
a wiper configured for wiping debris from the lens, wherein the wiper is attached to the camera and actuatable by the shape memory alloy;

wherein the shape memory alloy transitions between the first state and the second state to actuate the wiper so that the wiper contacts and translates across the lens and thereby wipes debris from the lens;

a door attached to the body and configured for covering the cavity when the camera is disposed in the stowed position;

a carrier attached to the camera and pivotably attached to the body;

a detent latch configured for alternatingly contacting the carrier to retain the camera in the stowed position and translating away from the carrier to transition the camera to the deployed position;

a resilient member attached to the body and the carrier and configured for transitioning the camera to the deployed position; and a ratchet assembly attached to the carrier and configured for transitioning the camera to the stowed position.

11. The camera system of claim 10, wherein the shape memory alloy is configured as a wire attached to the carrier and contracts in length in response to the thermal activation signal to transition the camera to the stowed position.

12. The camera system of claim 10, wherein the shape memory alloy is configured as a wire attached to the ratchet assembly and contracts in length in response to the thermal activation signal to transition the camera to the stowed position.

* * * * *